March 29, 1960

W. J. STRANG 2,930,550

AIRCRAFT FLIGHT CONTROLS

Filed Dec. 19, 1955

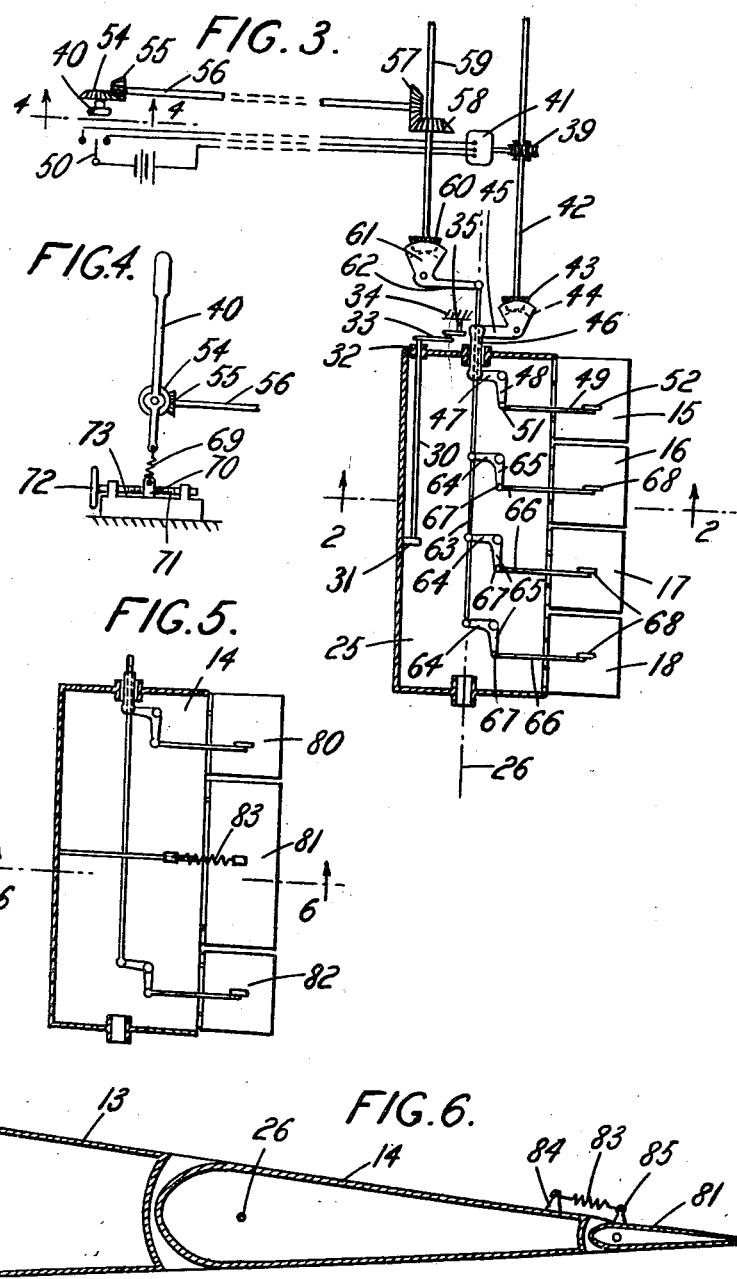

United States Patent Office 2,930,550
Patented Mar. 29, 1960

2,930,550

AIRCRAFT FLIGHT CONTROLS

William John Strang, Bristol, England, assignor, by mesne assignments, to Bristol Aircraft Limited, Bristol, England, a British company Application December 19, 1955, Serial No. 553,981

Claims priority, application Great Britain December 24, 1954

9 Claims. (Cl. 244—82)

This invention concerns fixed wing aircraft of the kind, hereinafter referred to as of the kind described, having an elevator aerofoil hinged to the air-frame structure and operated by a servo-tab system arranged at the trailing edge of the elevator, which servo-tab system is in turn so operated under the control of a pilot's pitching control, which is usually, and is hereinafter termed a "stick," that movements of the elevator do not react upon the stick.

An object of the invention is to provide an arrangement improving the longitudinal ability of aircraft of the kind described.

Another object is the provision, in an aircraft of the kind described, of resilient means which, at least when the aircraft is moving forwardly, act to produce a moment urging the elevator towards a downwardly deflected setting, the deflecting moment not being in excess of that which can be overcome by operation of the stick to an extent adequate for the safety of the aircraft during take-off and normal flying manoeuvres.

The general manner of operation of the device will be understood from the following simple cases. Supposing the aircraft to be in flight at a given speed with the stick and hence the elevator servo-tab system held fixed in the corresponding trimmed position to maintain the aircraft in level flight or a desired angle of climb or descent when a disturbance pitches the aircraft nose-up, the result will be a decrease in speed and hence a reduction in aerodynamic hinge moment on the elevator. The moment derived from the resilient means will thus no longer be balanced by the aerodynamic moment and since the elevator is free to move, independently of whether the stick is restrained by the pilot or not, the elevator will be deflected downwardly, thus tending to restore the aircraft to the original trimmed speed by pitching the nose down. Conversely a disturbance which pitches the aircraft nose-down causes an increase in speed and in aerodynamic hinge moment on the elevator which deflects the latter upwardly from its trimmed position against the moment derived from the resilient means and hence pitches the aircraft nose-up. In both cases the effect of providing the resilient means is thus to increase the longitudinal stability of the aircraft.

It is preferred that the resilient means acts directly between the elevator and a fixed part of the airframe of the aircraft.

The resilient means may act between the elevator or a fixed part of the airframe of the aircraft and a servo-tab hinged to the elevator at its trailing edge however, said servo-tab being separate of the servo-tabs of said servo-tab system which is operated under the control of the stick.

Specific embodiments of the present invention will now be described by way of example with reference to the accompanying drawings whereof:

Figure 3 is a diagrammatic illustration of the controls for one of the elevators of the aircraft shown in Figure 1, Figure 4 is a view on line 4—4 in Figure 3, Figure 5 shows an alternative elevator control arrangement for the aircraft shown in Figure 1, and Figure 6 is a cross-sectional view to a larger scale on line 6—6 in Figure 5.

Figure 1:
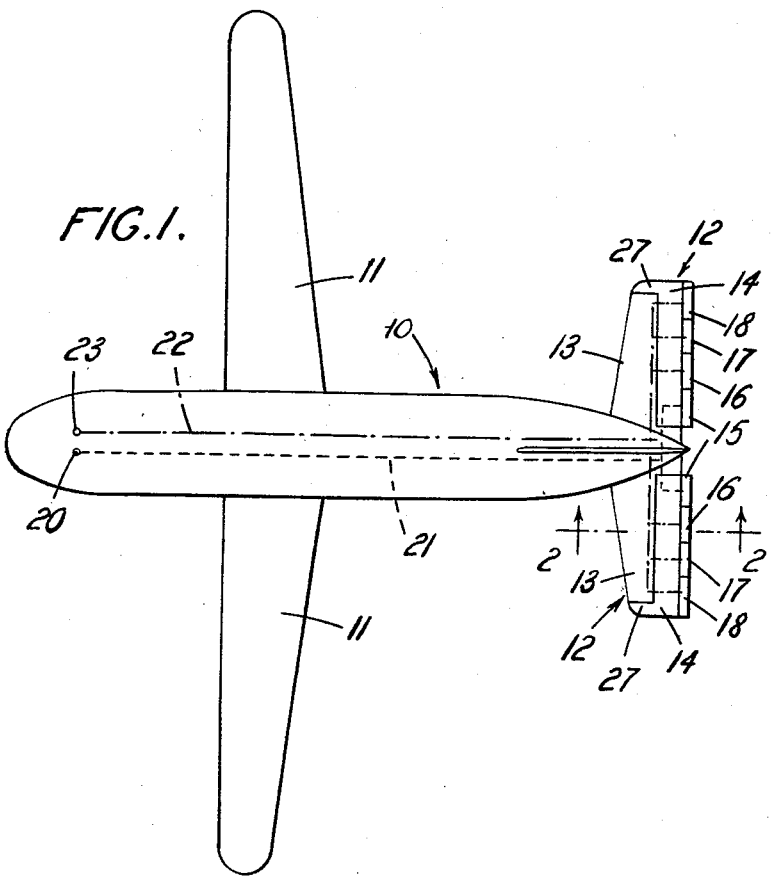
Figure 1 is a plan view of a fixed wing aircraft according to the invention.

Referring to Figure 1, the aircraft has a single central fuselage 10, main supporting planes 11 and tail planes 12, one on each side of the fuselage. The tail planes 12 each comprise a fixed leading part 13 and hinged thereto about a transverse axis, a trailing part 14 constituting an elevator. At its trailing edge each elevator 14 has four servo-tabs 15, 16, 17, 18 hinged to it. The two servo-tabs 15 are adjustable in common by a pilot's trimming control 20 through a mechanical transmission indicated by the dotted line 21. The transmission 21 is later described in detail. The remaining six servo-tabs 16, 17 and 18 on the two elevators are adjustable in common by the stick 23 through a similar mechanical transmission indicated by the chain dotted line 22, which is also later described.

Figure 2:
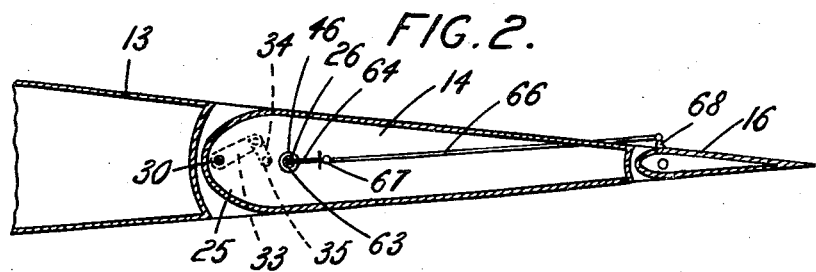
Figure 2 is a cross-section to a larger scale on line 2—2 in Figure 1.

Referring to Figures 2 and 3 each elevator 14 has a nose portion 25 of elliptical section projecting forwardly of its hinge axis 26 and serving as a partial aerodynamic balance for the elevator and also serving to house weights (not shown) to mass balance the elevator. The aerodynamic balancing of the elevators is substantially completed by a horn balance 27 (see Figure 1) at the outer end of each elevator. Part of the balancing mass in each elevator is constituted by a torsion bar spring 30 arranged near the tip of the nose portion 25 and with its axis parallel to the hinge axis 26. One end of the spring 30 is anchored to the elevator as at 31 and towards its other end the spring is supported in a journal bearing 32 carried by the elevator the other end of the spring 30 being provided with a lever 33 projecting towards the hinge axis, the free end of the lever 33 being connected by a link 34 to a pivot 35 carried by the tailplane so that rotation of the elevator about its hinge causes the spring 30 to be twisted. Since in this arrangement the mass of the spring assists the mass balancing of the elevator, very little weight is added to the structure by the incorporation of this invention. The springs are adjusted so that when the aircraft is stationary the elevators are depressed to the full extent of their downward travel, and the strength and rate of the springs 30 are suitably chosen so that neither during take off nor during normal flying manoeuvres is the pilot prevented from causing movement of the elevators by operation of the stick 40 (see Figure 3) to an extent adequate for the safety of the aircraft.

By varying the lengths of the lever 33, the link 34 and the spacing of the pivot 35 from the axis of the spring 30 and the hinge axis 26, the law relating the angle of incidence of the elevator to torque produced on the elevator by the spring 30 can be adjusted.

In the particular example being described the effective length of the lever 33 is 0.675 times the perpendicular distance between the axis of the spring 30 and the hinge axis 26, the effective length of the link 34 is 0.275 times said perpendicular distance, and the pivot 35 is spaced from the axis of the spring by 0.675 times said perpendicular distance.

The following table shows the torque exerted on the elevator at different angles of incidence and also the angles which the lever 33 makes with the longitudinal axis of the elevator. The torque on the spring 30 varies directly with the said angle, but the torque on the elevator is further modified by the linkage.

| Incidence degrees | Lever angle | Torque units on elevator |
|---|---|---|
| −38 | 36° | 30 |
| −30 | 35° | 89 |
| −25 | 34° | 116 |
| −20 | 32°20′ | 134 |
| −15 | 30°30′ | 146 |
| −10 | 28°20′ | 149 |
| −5 | 26° | 146 |
| 0 | 23°40′ | 137 |
| +5 | 21°20′ | 125 |
| +10 | 19° | 111 |
| +15 | 16°40′ | 96 |
| +18 | 15° | 85 |

This table shows that the spring is preloaded when the elevator is fully depressed (+18° incidence) and that the torque rises until an incidence of −10° is reached and then progressively falls off. From −10° to the negative limit of −38° the system thus has a negative rate characteristic. In some cases, particularly for high speed aircraft, it can be an advantage to modify the proportions of the link-work to extend this negative rate characteristic through the whole or a greater part of the total range.

When the elevators 14 are trimmed, by adjustment of the trimming control 20 acting on the two servo-tabs 15, so that in steady level flight at a normal flying speed and loading, and with the stick in a neutral pitching control setting, the elevators 14 take up a substantially neutral position, that is to say a position in which they form a fair continuation of the profile of the tailplane, any increase in flying speed, due for example to the aircraft pitching nose-down, results in an increased upward thrust on the trimming tabs with the result that the elevators are raised from their neutral position against the opposing moment of the springs and a nose-up righting moment is applied to the aircraft. Conversely, a decrease in flying speed is accompanied by a nose-down righting moment on the aircraft.

If the longitudinal trim of the aircraft becomes disturbed or there is some other occurrence necessitating movement of the stick to operate the servo-tabs 16, 17, 18 to adjust the elevators 14 to regain or set the aircraft in the required attitude, this results in a load on the stick. The pilot then may operate the trimming control 20 to adjust the servo-tabs 15 to take up the load on the stick, the stick being returned to its off-loaded neutral pitching control setting. The servo-tabs 16, 17, 18 are then set in their neutral position with respect to the elevators 14, which have taken up a position relative to the aircraft necessary to maintain the required attitude under the circumstances prevailing.

In steady level flight at normal flying speed and loading it is preferred that the elevators then take up a neutral position relative to the aircraft in which they form a faired continuation of the tail plane as hereinbefore described since as will be readily understood the drag imposed by the elevators is then at a minimum. For other conditions however, for example in a climb, the elevators would take up some other position. The trimming servo-tabs 15 and the springs however still act to product righting moments on the aircraft counteracting disturbances pitching the aircraft nose up or nose down from the required attitude.

The transmission 21 may take any well known or convenient form including, for the transmission of control force from the fuselage 10 into the elevators 14 without reaction on the latter, members movable rectilinearly along the hinge axes of the elevators. In the example being described the transmission 21 is illustrated in detail in Figures 2 and 3. Referring to these figures, the transmission comprises a reversible electric motor 41 which drives through reduction gearing 39 a shaft 42 mounted in bearings carried by the air-frame structure of the tailplane. The shaft 42 has at each end a bevel gear 43 which co-operates with a sector bevel gear 44 pivoted to the airframe structure of the tailplane. Each bevel gear 44 has an arm 45 connected by means of a push/pull rod 46 to one arm 47 of a bell crank lever pivoted within the adjacent elevator, the rods 46 lying generally along the hinge axes 26 of the elevators. The other arm 48 of each bell crank lever is connected to the servo-tab 15 on the elevator by means of a control rod 49, the rod 49 being connected to the bell crank lever by means of a universal joint 51 and to the servo-tab 15 by a lug 52.

A pilot operated switch 50 is provided which when closed, starts the motor 41 in one direction or the other so that, under the control of the pilot, the servo-tabs 15 can be adjusted.

Alternatively, instead of providing the trimming control 20 for the pilot, the servo-tabs 15 may be set in a previously determined fixed position so that when the aircraft is in steady level flight at normal speed and loading with the stick 40 in its neutral pitching control setting the elevators take up a substantially neutral position. In this case of course the transmission 21 just described is dispensed with.

The transmission 22 may also take any well known or convenient form including, for the transmission of control force from the fuselage 10 into the elevators 14 without reaction upon the latter, members movable rectilinearly along the hinge axes of the elevators. In the example being described the stick 40 is mounted for fore-and-aft movement to control the pitching of the aircraft as is normal. Fore-and-aft movement of the stick produces rotation of a bevel gear 54. The bevel gear 54 co-operates with a bevel gear 55 mounted on one end of a shaft 56. The other end of the shaft 56 carries a bevel gear 57, which co-operates with a bevel gear 58 mounted on a shaft 59. The shafts 56 and 59 are supported in bearings (not shown) carried from the air-frame structure, the shaft 59 being located transversely of the aircraft and within the tail plane. The shaft 59 has at each end a bevel gear 60 which co-operates with a sector bevel gear 61 pivoted to the air-frame structure of the tailplane. Each sector bevel gear 61 is provided with an arm 62 which is connected, by means of a push/pull rod 63 to one arm 64 of each of three bell crank levers pivoted within the adjacent elevator, the rods 63 lying generally along the hinge axes 26 of the elevators. The other arms 65 of the three bell crank levers are connected each to one of the servo-tabs 16, 17 and 18 by control rods 66, the rods 66 being connected to the bell crank levers by means of universal joints 67 and to the servo-tabs by lugs 68, so that movement of the arm 62 operates the servo-tabs 16, 17, and 18 in unison.

The areodynamic reaction of the servo-tabs 16, 17 and 18 is not sufficient to provide adequate "feel" resistance to movements of the stick 40, and accordingly a "feel" device is applied to the stick to produce a "feel" reaction of the desired strength. This "feel" device is shown diagrammatically in Figure 4. Referring to the figure, the device comprises a spring 69 connected between the bottom end of the stick and a block 70 threaded onto a rod 71 which is rotatable by a hand wheel 72 to move the block along a surface 73. The spring 69 is made adjustable for initial tension to vary the "feel" produced on the stick. The device as described also enables the pilot to take some or all the load of the stick when flying on a set course. To do this the pilot merely rotates the hand wheel 72 in the appropriate direction so that the spring 69 takes the desired share of the load.

Instead of using the separate trimming tabs 15 to offset the moment of the springs 30, the pitching control servo-tabs 16, 17 and 18 may be rigged relatively to the stick 40 to produce the same result. As already explained, in such an arrangement the "feel" device described with reference to Figure 4 may be adjusted to trim out the aerodynamic reaction occurring on the stick when the stick is in its neutral pitching control position.

In another arrangement, instead of providing a torsion bar spring 30 between each elevator 14 and the tailplane, one or more servo-tabs on each elevator may be urged upwardly each by resilient means from its neutral position in relation to the elevator to which it is hinged.

By way of example such an arrangement is shown in Figures 5 and 6. In this case each elevator 14 is provided with three servo-tabs 80, 81 and 82 hinged to its trailing edge. The servo-tabs 80 and 82 are trimming and pitching control servo-tabs respectively and are connected for adjustment, by means of transmissions as previously described, with the pilot's trimming control and stick. Each of the servo-tabs 81 is urged by a coil spring 83 connected between a horn 84 on the elevator and a horn 85 on the servo-tab, to an upwardly deflected setting relative to the elevator to which it is hinged so as at all times to produce an aerodynamic moment on the elevator urging the elevator towards a downwardly deflected setting when the aircraft is in flight thereby stabilising the aircraft longitudinally as previously explained.

In the arrangement described with reference to Figures 5 and 6 each of the spring-urged servo-tabs 81 cannot pass below the neutral position relatively to the elevator to which it is attached without causing reverse action and therefore a decrease instead of an increase in longitudinal stability. This rules out the possibility of using either the stick-operated tabs 16, 17, 18 and 82 or the trimming tabs 15 and 80 for this purpose simply by the addition of a spring in the appropriate transmission.

The arrangement shown in Figure 5 may also be modified to replace the pilot-controlled trimming tab 80 by a fixed trimming tab as described in connection with Figure 3.

I claim:

1. In a fixed wing aircraft comprising an airframe structure, a pilot's pitching control stick, an elevator aerofoil hinged to the airframe structure and movable relatively to the airframe structure independently of movement of said stick, and a servo-tab system for operating the elevator, said servo-tab system being operatively connected with said stick and carried by the elevator at the trailing edge of the elevator, resilient means acting directly between the elevator and said airframe structure, said resilient means urging said elevator towards a downwardly deflected setting with a moment predeterminedly less than that capable of being exerted on said elevator by said servo-tab system to urge said elevator into an upwardly deflected setting during take-off and normal flying manoeuvres of the aircraft.

2. An aircraft as claimed in claim 1, wherein the operative connection between said stick and said servo-tab system is afforded by transmission means which, when the stick is in a neutral pitching control position, holds the servo-tab system in a setting providing, in steady level flight at normal speed and loading, sufficient turning moment upon the elevator to hold the latter in or near its neutral position relatively to the longitudinal axis of the aircraft against the turning moment exerted on the elevator by the resilient means.

3. An aircraft as claimed in claim 1, wherein the elevator is provided with a second servo-tab system for producing, in steady level flight at normal speed and loading, a turning moment on the elevator which holds the elevator in or near its neutral position relatively to the longitudinal axis of the aircraft against the downwardly deflecting moment exerted on the elevator by the resilient means, said second servo-tab system being separate of the stick-controlled servo-tab system and carried by the elevator at the trailing edge of the elevator.

4. An aircraft as claimed in claim 1, wherein said resilient means comprises a torsion bar spring arranged parallel with the hinge axis of the elevator, one end of the torsion bar being anchored to the elevator, and the torsion bar being supported towards its other end in a journal bearing carried by the elevator, the other end being provided with a lever pivotally connected to a link which is in turn pivotally connected to said airframe structure, so that movement of the elevator about its hinge axis causes the torsion bar spring to be twisted.

5. An aircraft as claimed in claim 4, wherein the torsion bar spring is located forwardly of the elevator hinge axis and serves in the mass balancing of the elevator.

6. An aircraft as claimed in claim 4, wherein the relative lengths of said lever and said link, and the spacing of the pivot connecting the link to the air-frame from the hinge axis of the elevator and the axis of the torsion bar spring are all so selected that the torsion bar spring is preloaded when the elevator is in its maximum downwardly deflected setting, and the torque exerted on the elevator by the torsion bar spring first rises and then reduces as the elevator is moved from its maximum downwardly deflected setting through its neutral position relative to the longitudinal axis of the aircraft to its maximum upwardly deflected setting.

7. An aircraft as claimed in claim 6, wherein the torque exerted on the elevator by the torsion bar spring reduces as the elevator is moved from a predetermined downwardly deflected setting less than its maximum downwardly deflected setting through its neutral position relative to the longitudinal axis of the aircraft to its maximum upwardly deflected setting.

8. An aircraft as claimed in claim 6, wherein the aircraft is a high speed aircraft, and the torque exerted on the elevator by the torsion bar spring reduces as the elevator is moved through its whole range of movement from its maximum downwardly deflected setting to its maximum upwardly deflected setting.

9. In a fixed wing aircraft comprising an airframe structure, a pilot's pitching control stick, an elevator aerofoil hinged to the airframe structure and movable relatively to the airframe structure independently of movement of said stick, and a servo-tab system for operating the elevator, said servo-tab system being operatively connected with said stick and carried by the elevator at the trailing edge of the elevator, resilient means acting directly between the elevator and said airframe structure, said resilient means urging said elevator towards a downwardly deflected setting with a moment predeterminedly less than that capable of being exerted on said elevator by said servo-tab system to urge said elevator into an upwardly deflected setting during take-off and normal flying manoeuvres of the aircraft, a second servo-tab system separate of the stick controlled servo-tab system and carried by the elevator at the trailing edge of the elevator for producing during flight a turning moment on the elevator in opposition to that exerted by said resilient means, and a pilot's trimming control operatively connected with said second servo-tab system and operable to adjust the second servo-tab system to trim the aircraft in a desired attitude with the stick in its off-loaded neutral pitching control setting.

References Cited in the file of this patent

UNITED STATES PATENTS

| | | |
|---|---|---|
| 2,057,877 | Bragunier | Oct. 20, 1936 |
| 2,438,309 | Zimmerman | Mar. 23, 1948 |
| 2,605,063 | Gilruth | July 29, 1952 |
| 2,721,713 | Meredith | Oct. 25, 1955 |
| 2,797,882 | Servanty | July 2, 1957 |

FOREIGN PATENTS

| | | |
|---|---|---|
| 100,266 | Sweden | Sept. 12, 1940 |